May 19, 1970    O. VON KRUSENSTIERNA ET AL    3,512,413
MEASURING BODY CAPABLE OF BEING BUILT INTO THE
WALL OF A HIGH-TEMPERATURE FURNACE
Filed Sept. 28, 1967      3 Sheets-Sheet 1
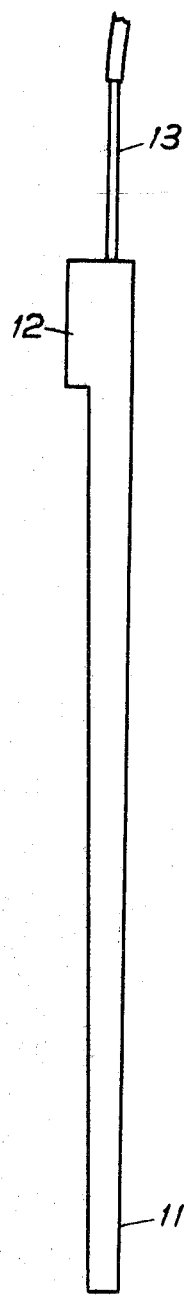
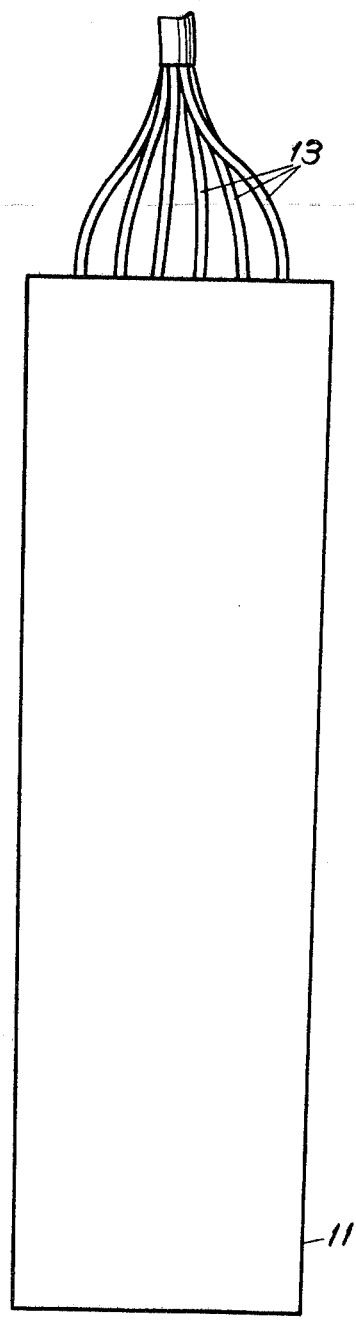
INVENTOR.
OTTO VON KRUSENSTIERNA
JANIS BLAUS
BY
Jennings Bailey, Jr

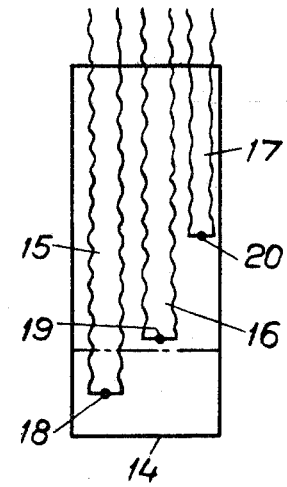
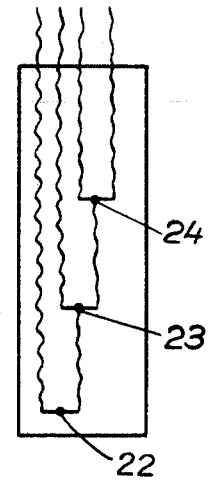
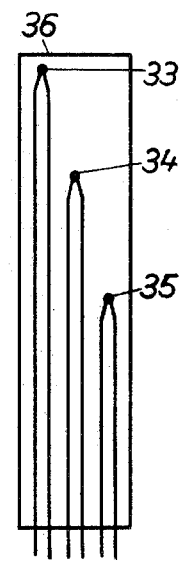
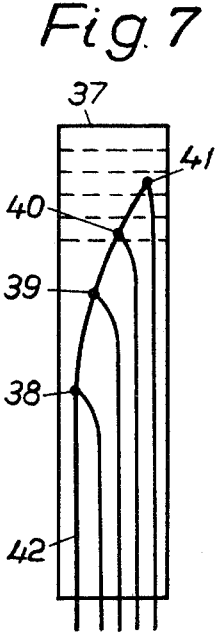

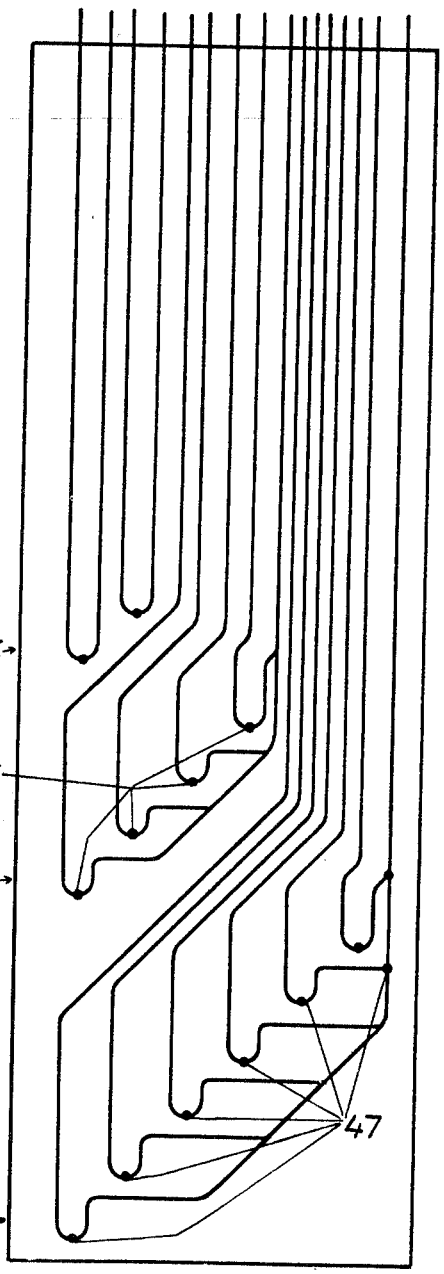
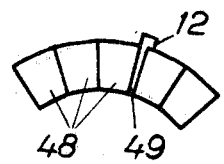
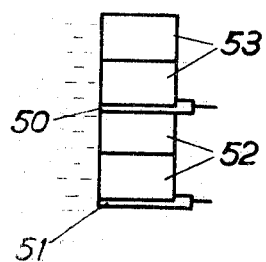
Fig. 5
Fig. 9
Fig. 10
INVENTOR.
OTTO VON KRUSENSTIERNA
JANIS BLAUS
BY

United States Patent Office 3,512,413
Patented May 19, 1970

---

3,512,413
MEASURING BODY CAPABLE OF BEING BUILT INTO THE WALL OF A HIGH-TEMPERATURE FURNACE
Otto von Krusenstierna, Stockholm, and Janis Blaus, Vasteras, Sweden, assignors to Allmanna Svenska Elektriska Aktiebolaget, Vasteras, Sweden, a corporation of Sweden
Filed Sept. 28, 1967, Ser. No. 671,277
Claims priority, application Sweden, Oct. 5, 1966, 13,410/66
Int. Cl. G01k 7/04, 1/14
U.S. Cl. 73—341
2 Claims

ABSTRACT OF THE DISCLOSURE

A body of sintered heat-resistant material of generally flat, elongated shape contains wires entering at one end and extending to measuring points at different distances from the second end; the body is built into a furnace wall with the second end forming a part of the inside surface of such wall; erosion of the inner end can be measured by the fact that the innermost measuring points are destroyed as the body erodes with the wall.

BACKGROUND OF THE INVENTION

Field of the invention

The present invention relates to a measuring body for use in high temperature furnaces, such as arc furnaces, foundry furnaces, or the like.

For example, in the manufacture of steel and during casting it is very important to have accurate information concerning the temperature of the furnace and the charge in order to satisfactorily carry out the processing casting and to enable checking and possibly automatic control of the process. Due to the high temperature in the furnace and the presence of furnace gases and corrosive slag, such continuous temperature control by means of continuous measurement is not easy to carry out. Another difficulty is the rapid wear on the furnace walls, roof and bottom during these high temperature processes which means that only a limited number of charges can be handled before the furnace must be relined.

Description of the prior art

Several means are known for temperature measurement in such furnaces. For example immersion-pyrometers have been used which give a single signal before being destroyed. Measurement is done intermittently, for example twice during each charge, and the process can be controlled according to the signals. However, it is clear that such control is not as valuable as a continuous control. It is also possible to determine the temperature optically but it is then necessary to be able to observe a melt surface free of slag and not clouded by fumes, which is often difficult. Attempts have also been made to measure the temperature by means of a thermoelement inserted in a protective tube, for example of Pt-Rh type, but this requires a high standard of protection from the protective tube, which may be difficult, and also the existence of notches or holes in the furnace lid, roof or walls which weakens the furnace construction. It is also often difficult for the protective tube to withstand the effects of furnace gases and slag.

SUMMARY OF THE INVENTION

The invention provides a solution of these and other problems associated with them and is characterised in that the measuring body consists of a thin plate of heat-resistant material inside which metallic conductors for measuring purposes are led from an end outside the furnace to points at different distances from a free end inside the furnace, which plate is intended to be attached when the furnace is built at desired measuring points between the bricks of the furnace or in the walls in such a way that the free end is in communication with the inner wall of the furnace. The measuring body arranged in this way can easily be inserted between two furnace bricks and a completely tight joint is obtained without weakening the wall, roof or bottom. Such measuring bodies can be inserted anywhere in the brickwork or solid parts of the furnace without the need for holes or the like being made to carry the protective tube. The body itself acts as protective tube. By means of this measuring body it is possible to continuously measure the furnace temperature (charge temperature) and/or wall thickness, and this can continue even when the furnace walls are worn, right up until the time when the furnace must be taken out of operation for relining and then of course new measuring bodies can be built in as desired and continous measurement and possibly conrol can be carried out. The measuring body can be made of sintered or unsintered material and in the latter case sintering can be obtained through the furnace heat when the measuring body starts to be used.

BRIEF DESCRIPTION OF THE DRAWINGS

The measuring body is exemplified in the accompanying figures where FIGS. 1 and 2 show pictures from above and from the side of a measuring body, FIGS. 3 and 4 two alternative embodiments of measuring bodies seen in cross section, FIGS. 6 and 7 alternative embodiments of measuring bodies for thermoelements and FIG. 8 a temperature graph for these elements with extrapolation and FIG. 5 a measuring body with a large number of thermoelements. FIG. 9 shows a furnace roof and FIG. 10 a furnace wall, both with inserted measuring bodies.

DESCRIPTION OF THE PREFERRED EMBODIMENTS

FIGS. 1 and 2 show a measuring body 11 of heat-resistance material, for example sintered unsintered material. The material may be $Al_2O_3$ with a hydraulic binder such as aluminate cement or substantially dolomite, magnesite or the like, and the material may be sintered when it is built in or unsintered, in which case it may be sintered by the heat of the furnace. The body may have a heel 12 or some other supporting part to facilitate application of the body 11.

Inside the body 11 several metallic conductors 13 are arranged, either leading to thermoelements or to insulated points, in the first case for measuring temperature and possibly wall thickness, and in the latter case solely for measuring wall thickness. The body 11 is a thin plate or sheet and can easily be built-in or otherwise attached to the furnace wall, roof or bottom during building or relining. The number and position of the bodies can be determined according to where measurements are required. The flat shape makes attachment simple and joints can be extremely tight without the necessity of holes or notches which would impair the construction. In this case the body is rectangular, but it may also be shaped as a parallel-trapezium, polygon or with gently rounded sides. The conductors may be led to the free end or to points near to this. The body may also be attached to the furnace by means of punching. In the latter case the body should be provided with attaching means to retain it in the furnace lining (not shown). The polygon shape is usual with punching (four-sided, six-sided).

FIG. 3 shows a measuring body with three thermoelements 15, 16, 17 having contact points 18, 19 and 20 situated at different distances from the end 14 at the melt.

When the measuring body is applied the thermoelements indicate different measuring values for the temperature and by means of extrapolation according to FIG. 9, the charge temperature can be calculated. This calculation may also be carried out by a computer. By resistance measurement between conductors belonging to two different thermoelements, the wall thickness can also be indicated, that is the inner wall is situated where the melt brings about short-circuiting between these conductors. As the wall becomes worn (see dotted line) the counter values alter and the temperature measuring gradually disappears at the contact point 18, but continues at 19 and 20 so that measurement of the temperature (and wall thickness) can continue during the whole operating time of the furnace.

In order to avoid temperature errors due to long temperature paths, the conductors near the contact points can be placed parallel to the free end 14 and will then follow the isotherms. The conductors may be of platinum rhodium (Pt-Rh) and have different composition for the conductors within each thermoelement for example (5% Rh+95% Pt and 20% Rh+80% Pt or the last-mentioned 40% Rh+60% Pt). By means of this construction good accuracy is obtained with the high temperatures concerned (1200°–2000° C. in the manufacture of steel).

To prevent breaks in the conductors due to differences in the coefficient of longitudinal expansion, these have been made in wave, spiral or zig-zag form and may be wires, tapes, tubes, etc. (see FIG. 3–4).

In FIG. 4 a second measuring body is shown in which one conductor in each the thermoelement (22, 23, 24) is connected to or near the contact point (soldering point) of the following thermoelement. One conductor in each thermo-conductor, that is baked in thermoelement wires (or rods) may be surrounded by a softer insulating layer in comparison with the brickwork, in order to facilitate alterations in length without a risk of breaking and for electrical insulation. The latter is particularly important with lining substances having low resistivity, for example chromium-magnesite.

In FIG. 7 four thermoelements measuring points 38–41 at different distances from the free end 37 are arranged on a common conductor 42 (see also FIG. 4). FIG. 8 shows measured temperatures at the different measuring points in FIG. 7 and at 21 is shown the extrapolation measuring value for the charge temperature at the start. As the body is worn (see the broken lines in FIG. 7) the measuring values increase for the following thermoelements, but during extrapolation the y-axis in FIG. 8 must be moved to the right in the figure to keep pace with the end 37 and thus the furnace wall and/or roof. The extrapolation and thus the temperature indication and also the wall thickness can, with the help of computers, be indicated directly and possibly the output signal of the computer can be used as input signal in a control circuit, for example for power control or electrode feeding (not shown).

FIG. 5 shows a measuring body with a large number of thermoelements placed in several rows 43, 44, 45 and having partly common second conductors 46, 47. In this case the measuring accuracy can be very high. In the arrangement according to FIG. 5 the thermoelements may, for example, be placed every centimeter and in this way an almost continuous measurement of the wall thickness is obtained, which is also necessary for extrapolation of the temperature.

FIG. 9 shows a detail of a furnace roof with furnace bricks 48 where a measuring body 49 has been inserted (built in) between two bricks.

FIG. 10 shows a furnace wall with a measuring body 50, 51 between alternate furnace bricks 53, 52. The free end is turned to the left in the figure, that is towards the charge. Correspondingly the measuring body can be used with bricked or punched bottom and the wall may also be punched.

The arrangement according to the invention may, of course, be varied in many ways.

What is claimed is:

1. Measuring body for use in high temperature furnaces comprising a thin plate of heat resistant material and metallic conducting means for measuring embedded in said plate extending from a first end to points at different distances from the other free end, said plate being adapted and arranged for fastening in a furnace wall with its free end forming a portion of the inner wall of the furnace, the conducting means comprising elongated electrical conductors baked into the heat-resistant material and at least partly in a form deviating from a straight line.

2. Measuring body for use in high temperature furnaces comprising a thin elongated plate of heat resistant material and metallic conducting means for measuring embedded in said plate extending from a first end to points at different distances from the other free end, said measuring means at said points comprising contact portions between two conductors and being of thermo-couple type, said plate being adapted and arranged for fastening in a furnace wall with its free end forming a portion of the inner wall of the furnace, the conducting means on both sides of the measuring points being substantially parallel to the free end of the plate.

References Cited

UNITED STATES PATENTS

| 2,681,573 | 6/1954 | Brown | 73—341 |
|---|---|---|---|
| 3,018,663 | 1/1962 | Dunlop | 73—348 |
| 3,357,237 | 12/1967 | Le Bel | 73—86 |
| 3,367,175 | 2/1968 | Morreal | 73—86 |

S. CLEMENT SWISHER, Primary Examiner

D. E. CORR, Assistant Examiner

U.S. Cl. X.R.

73—344; 136—230